(12) United States Patent
Chang et al.

(10) Patent No.: US 6,387,313 B1
(45) Date of Patent: May 14, 2002

(54) GATE FOR INJECTION MOLDING RUBBER COMPOUNDS

(75) Inventors: Ching-Chian Chang, Copley; John Richard White, Wadsworth, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/461,907

(22) Filed: Dec. 15, 1999

(51) Int. Cl.[7] .......................... B29C 45/00; B29C 45/27
(52) U.S. Cl. .............................. 264/328.2; 264/328.12; 425/543; 425/573
(58) Field of Search .................. 264/328.2, 328.12; 425/543, 573

(56) References Cited

U.S. PATENT DOCUMENTS

| | | |
|---|---|---|
| 2,426,651 A | 9/1947 | Stacy |
| 3,989,434 A | 11/1976 | Mercer |
| 4,199,315 A | 4/1980 | Gallizia et al. |
| 4,848,920 A | 7/1989 | Heathe et al. |
| 5,178,458 A | 1/1993 | Hsu |

FOREIGN PATENT DOCUMENTS

| | | |
|---|---|---|
| WO | WO/98/13185 | 4/1998 |
| WO | WO/98/56559 | 12/1998 |

*Primary Examiner*—Leo B. Tentoni
(74) *Attorney, Agent, or Firm*—Nancy T. Krawczyk

(57) ABSTRACT

A combination rubber injection gate system (24) and method of injection molding rubber to produce desired flow patterns in the rubber is disclosed. The combination gate (24) directs rubber through a first region (26) to flow at cross angles (38, 40) through the injection gate (24), relative to the direction of flow of the rubber (22) through the injection gate (24). The rubber (22) is then directed through an adjacent region (28) to flow through the injection gate (24) at a direction parallel to the direction of flow of the rubber (22) through the entire injection gate (24). The combination gate (24) yields a highly mixed and uniform flow of rubber (22) that is particularly useful when injection molding fiber-loaded rubber where it is desired to orient the fibers in a particular direction.

8 Claims, 3 Drawing Sheets

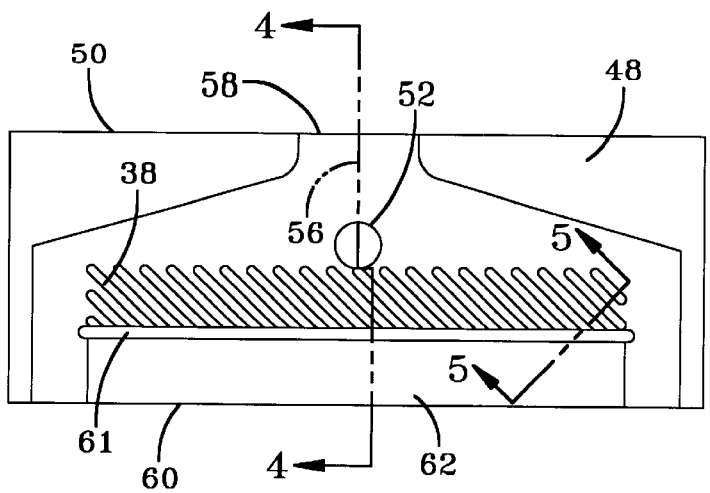
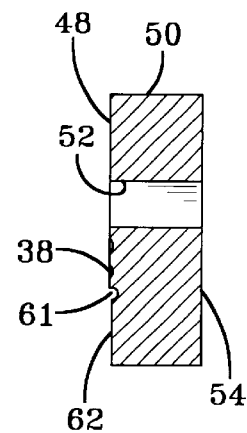
FIG-3  FIG-4
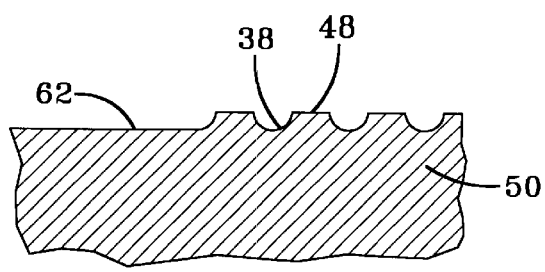
FIG-5
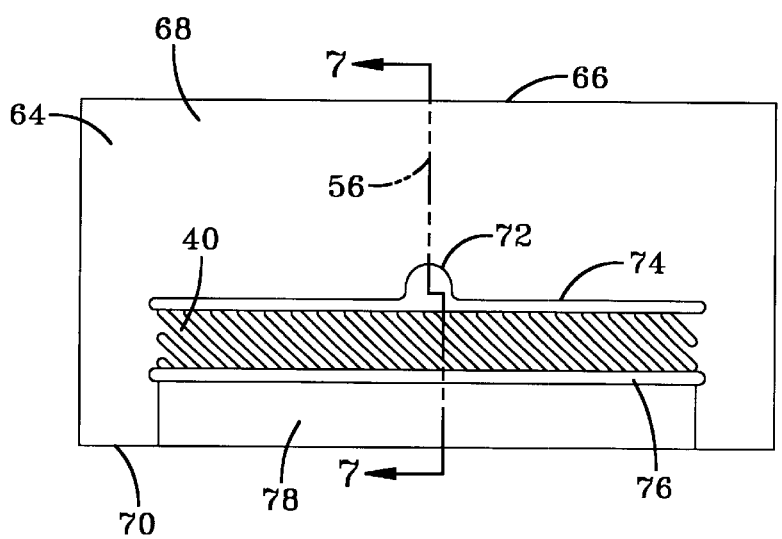
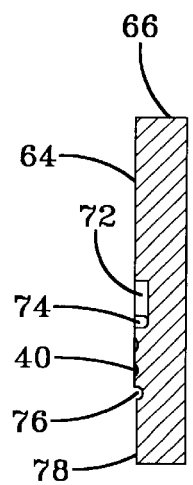
FIG-6  FIG-7

GATE FOR INJECTION MOLDING RUBBER COMPOUNDS

TECHNICAL FIELD

The present invention relates to an improved gate design for injection molding of rubber compounds to form rubber articles. More particularly, the present invention relates to an improved gate design for injection molding of fiber loaded rubber compounds with increased gate heating efficiency, reduced cycle time during the rubber part being injection molded, and improved fiber orientation in the rubber article.

BACKGROUND ART

In a typical rubber injection molding process, see FIG. 9, the uncured viscous rubber compound is introduced into the elongated barrel 12 of an injection molding machine 10 at ambient temperatures. It is advanced through the barrel 12 towards a mold 20 connected to the downstream end of the barrel 12, usually by either a rotating screw conveyor or a reciprocating ram or piston 14 disposed in the barrel 12. As the rubber compound advances, it is heated by heat conduction and mechanical shear heating in the barrel 12 to reduce its viscosity and render the rubber more flowable and amenable to subsequent injection into the mold 20. Typically, the less viscous the rubber compound, the more easily it flows through the conventional gate system 16 and more easily it fills the mold cavity 18 to produce a satisfactorily molded object.

Composite articles formed of an elastomeric base and reinforcing fibers are known in the art. The reinforcing fibers impart improved mechanical properties, such as abrasion resistance, tensile strength, compression resistance, and the like to the article. The fiber distribution and orientation are important factors which affect such properties. Controlling fiber orientation, therefore, is an important consideration to provide a reinforced article having the desired mechanical properties.

One known composite article is a tire tread. It is known that short-fiber reinforced treads with fibers oriented perpendicular to the tread surface can provide improved wear resistance and have excellent cornering resistance. Unfortunately, treads prepared by a conventional extrusion process have fibers oriented in the extrusion direction, that is, the tire circumferential direction. This orientation direction actually worsens the wear property because fibers oriented parallel to the rotational direction easily come off the tread surface.

An expanding die technology was developed to alter the fiber orientation direction. This technology is used to prepare short fiber reinforced tread extrusions with fibers oriented perpendicular to the tread surface. This technology is disclosed in WO 98/13185. WO 98/13185 is hereby fully incorporated by reference.

There are two steps involved in the expanding die technology. First a flat gate is used to orient fibers in the extrusion direction (or parallel to the tread surface). Then, the orientation direction of the fibers is changed to normal direction (or perpendicular to the tread surface) due to the folding action of the expanding die. Results showed that this technology prevented the fibers from orienting in the extrusion direction due to the folding action of the expanding die. However, it has been determined that the fibers are not exclusively oriented perpendicular to the tread surface, but there is also a lateral orientation of the fibers in the width direction of the tread.

The main reason for the lateral orientation in the width direction is due to the flat gate design combined with the expanding die. The pressure drop through the center path of the die is smaller than at the side path due to the additional pressure drop through the runner. This results in faster rubber flow at the center of the gate that creates a slight width direction extensional flow and lateral fiber orientation.

Another type of known gate is the lattice gate, disclosed in WO 98/56559. The lattice gate of WO 98/56559 minimizes differences in temperature and pressure that result in a parabolic rubber flow through the gate. This is achieved by a series of crossed flow channels. WO 98/56559 is fully incorporated herein by reference. However, for molding fiber-loaded compounds with a particular fiber orientation, the lattice gate fails to provide any particular orientation of the fiber. Due to the inclination angle of the flow channels and the flow of the rubber through the channels, the fibers are oriented at angles corresponding to the flow channels. The fiber-loaded ribbons coming out of the channels tangle with each other in a random structure that result in a random orientation of the fiber. Thus, the lattice gate alone cannot be used to prepare compounds with a specific fiber orientation.

The present invention provides an improved method and apparatus for injection molding rubber and, preferably, orienting fibers in a composite article, which overcomes the limitations of the known gate systems.

SUMMARY OF THE INVENTION

The present invention is an improved method of injection molding rubber. The method includes injecting a rubber through an injection gate to produce desired flow patterns in the rubber. The rubber is first directed to flow at cross angles through the injection gate, relative to the direction of flow of the rubber through the injection gate. The rubber is then directed to flow through the injection gate at a direction parallel to the direction of flow of the rubber through the entire injection gate.

In one aspect of the disclosed invention, the rubber is a fiber-load rubber. When the fiber-load rubber travels through the injection gate in accordance with the invention, the fibers are first oriented at the cross flow angles and then re-oriented to the direction of flow parallel to the flow direction of the rubber through the entire injection gate.

In another aspect of the invention, the distance of the cross-directional rubber flow, relative to a centerline of the gate, relative to the parallel-direction rubber flow, relative to the centerline of the gate, is within the ratio of 2:1 to 1:2.

Another aspect of the invention includes the step of directing the rubber through an injection gate exit into a mold cavity to form a series of folding planes perpendicular to the direction of flow through the injection gate exit.

BRIEF DESCRIPTION OF DRAWINGS

The invention will be described by way of example and with reference to the accompanying drawings in which:

FIG. 3 is a plane view of half the combination gate at the sprue, or fixed mold, side;

FIG. 4 is a view through line 4—4 of FIG. 3;

FIG. 5 is a view through line 5—5 of FIG. 3;

FIG. 6 is a plane view of the other half of the combination gate at the moving mold side;

FIG. 7 is a view through line 7—7 of FIG. 6;

DETAILED DESCRIPTION OF THE INVENTION

Figure 1:
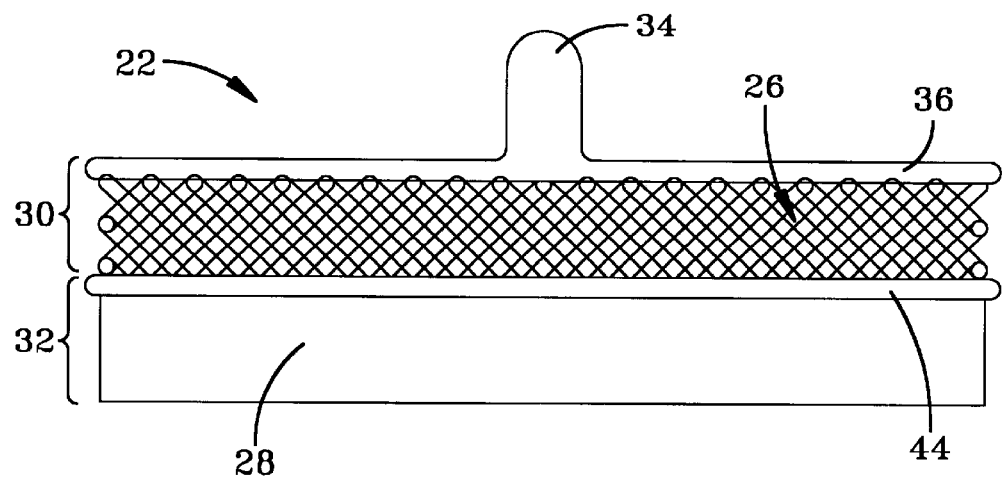
FIG. 1 is a plan view of rubber formed in a combination gate in accordance with the present invention.

The present invention is related to the design of an improved gate system for improving the mixing uniformity, temperature uniformity, and the fiber orientation of the rubber exiting the gate system. FIG. 1 is a shaped portion of rubber 22 that corresponds to the internal flow passage through the inventive gate system 24. The inventive gate system 24 is a combination of a lattice region 26 and a flat region 28. The entrance section 30 of the gate 24 is a lattice region 26 that provides a more uniform distribution of rubber compound. The exit section 32 is a flat region 28 that orients fibers in the injection direction. This unique combination gate system 24 provides a uniformly distributed rubber flow to the mold cavity 18 and, when using a fiber-loaded compound, improves the degree of fiber orientation in a fiber-loaded compound.

Figure 2:
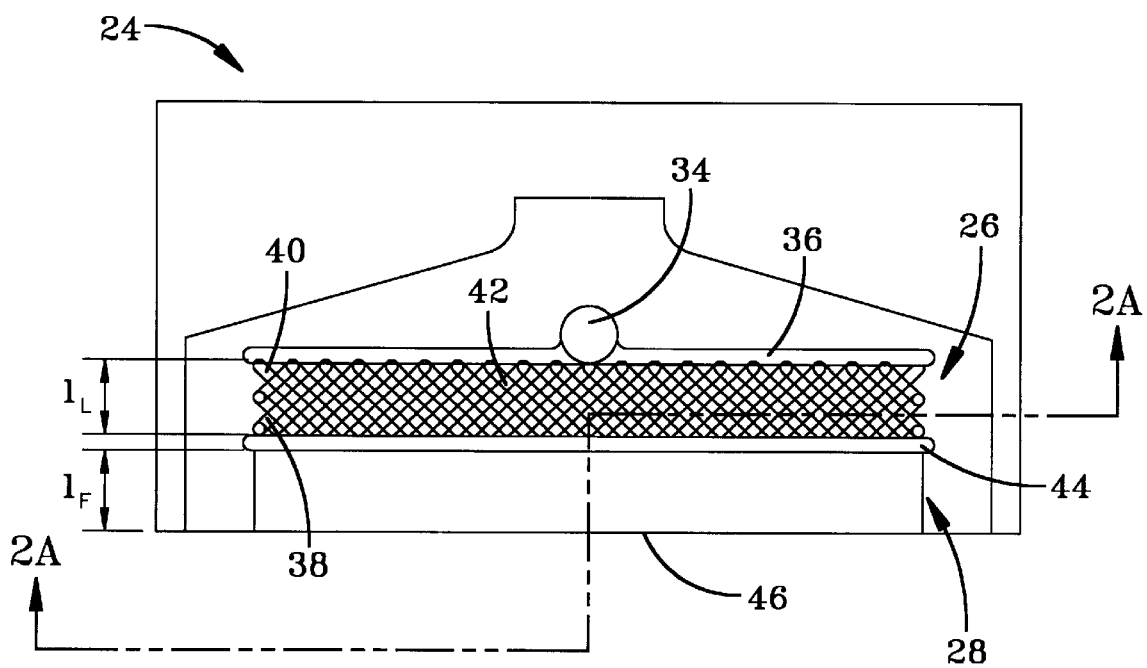
FIG. 2 is a schematic illustration showing the inventive combination gate.

The improved gate system 24, illustrated in FIG. 2, incorporates a sprue channel 34, a first distribution channel 36, a lattice region 26 of intersecting rubber flow channels 38, 40, a second distribution channel 44, and a flat region 28. The rubber 22 flows from the sprue channel 34, into the first distribution channel 36, and into the intersecting flow channels 38, 40. The intersecting rubber flow channels 38, 40 force the rubber 22 flowing through the lattice region 26 of the gate system 24. Because of this structure, rubber 22 exiting the lattice region 26 is uniformly distributed when it enters channel 44. Upon entering the flat region 28, because of the flow direction of the rubber 22 towards the gate exit 46, any fibers present in the rubber 22 are reoriented to be parallel to the rubber flow direction.

The components of the combination gate system 24 are more clearly illustrated in FIGS. 3–7. FIG. 3 illustrates a plan view of the inner surface 48 of the gate plate 50, which is half of the combination gate 24 at the sprue side. The plate 50 includes a sprue bore 52 that extends from the outer surface 54 to the inner surface 48. The plurality of flow channels 38 formed into the inner surface 48 of the plate 50 are parallel to each other and inclined at angles of about 30° to about 70°, preferably at angles of about 45° to about 60°, with respect to a centerline 56. As the angle of the parallel flow channels 38 with respect to the centerline 56 increases, the time required for the rubber 22 to transverse between the inlet 58 and outlet 60 sides of the plate 50 also increases, and vice versa. The flow channels 38 are illustrated with a semi-circular cross-section; however, it is within this invention to form the flow channels 38 with other cross-sections, such as elliptical, triangular, or square as desired.

The flow channels 38 terminate in the distribution channel 61. Adjacent to the distribution channel 61 is an indented flat region 62, as seen in FIGS. 4 and 5. Rubber flows directly from the channels 38 to the distribution channel 61 and into the flat region 62 towards the outlet end 60 of the sprue plate 50. The depth of the distribution channel and the depth of the flat region may be equal or different as illustrated.

Referring now to FIG. 6, there is shown a plan view of the flat inner surface 64 of the other half of the combination gate plate 66 having an inlet end 68 and an outlet end 70. A sprue inlet counterbore 72 extends into the inner surface 64 and is positioned between the inlet end 68 and the outlet end 70 of the plate 66. As illustrated in FIG. 7, the sprue inlet counterbore 72; is in flow communication with an elongated distribution channel 74 extending partially across the length of the plate 66 and in parallel relation to the outlet end 70. A plurality of flow channels 40 are formed in the inner surface 64 of the plate 66. The flow channels 40 are formed similar to the channels 38 formed on the plate 50.

Adjacent to the flow channels 40 is a second elongated distribution channel 76 that extends parallel to the first elongated distribution channel 74. An indented flat region 78 is formed extending from the second distribution channel to the outlet end 70 of the plate 66. Mixed rubber flows from the channels 40 to the second distribution channel 76 towards the outlet end 70 of the plate 66. Also, as seen in FIG. 7, the distribution channels 74, 76 have a depth greater than the depth of the channels 40 or the indented flat portion 78.

Figure 2A:
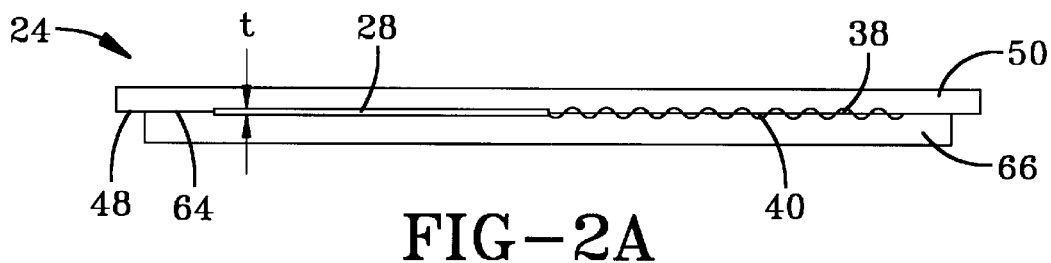
FIG. 2A is a view through line 2A—2A of FIG. 2.

Referring to FIGS. 2 and 2A, there is shown the inventive gate system 24 with the flat inner surface 48 of the sprue side gate plate 50 abutted against the flat inner surface 64 of the other side gate plate 66 and secured thereto by conventional means such as bolting one to the other. After the plates 50, 66 are secured to each other, the sprue bore 52 and the sprue inlet counterbore 72 intersect to form sprue channel 34. Also, the inner surface 48 of plate 50 lo abuts against the elongated distribution channel 74 to form first distribution channel 36.

Channels 38 and 40 abut against each other. Because the channels 38, 40 are inclined in the same direction in the plates 50, 66, when one plate is flipped over to abut the two inner surfaces 48, 64 of the plates 50, 66, the channels are then oriented in cross-directions to form the lattice region 26. The distribution channel 61 of the plate 50 abuts against the distribution channel 76 of plate 66 to form the second distribution channel 44. The indented flat region 62 of the plate 50 abuts against the indented flat region 78 of the plate 66 to form the flat region 28 with a constant thickness t.

An important aspect of the invention relates to the configuration of the flow channels 38, 40 and the flat region 28 after the gate system 24 is assembled. The flow channels 38, 40 are disposed to intersect each other at an angle of about 60° to about 140° with respect to each other, preferably about 90° to about 120° with respect to each other. Also, portions of the flow channels 38, 40 of plate 50 and plate 66, respectively, are partially formed, typically with a half circle or an elliptical shape, resulting from being abutted against the flat inner surface 48, 64 of the opposing plates 50 or 66. The remaining portions of the flow channels 38, 40 are formed at the intersections 42 of the flow channels and are illustrated in FIG. 2A as having an elliptical shape. The lattice portion 26 of the inventive gate system 24 effectively creates more physical mixing, rubber-to-rubber shear heating, and thermal mixing than in the flat design portion 28 of the gate system 24.

The flat region 28 provides for a preferred orientation of the fiber in the rubber compound 22. Due to the flow of the rubber 22 through the lattice channels 38, 40, the fibers in the compound exiting the channels 38, 40 and entering the second distribution channel 44 have an orientation corresponding to the channel inclination angle, relative to the centerline 56 of the gate plates 50, 66. In order to achieve a rubber flow, and thus fiber orientation, parallel to the centerline 56 of the gate plates 50, 66, the flow direction of the rubber must be reoriented 60° to 20°, or 45° to 30° if the channels 38, 40 are at the preferred inclination angles. The necessary reorientation of the rubber and fibers is less than any required reorientation of the fibers for known flat gate designs.

After the plates 50 and 66 are assembled, the flat region 28 has a thickness t and a length $l_F$ associated with it, see FIGS. 2 and 2A. Both the thickness t and the length $l_F$ are optimized to allow for the reorientation of the fibers carried within the rubber 22 flowing through the flat region 28 of the gate system 24. Because of the range of fiber length, the thickness t of the flat region 28 of the gate 24 must be comparably narrow with respect to the inlet ports known in the prior art in order that a majority of the fibers are aligned with the flow direction F of the rubber 22 (see also FIG. 8). Also, if the length $l_F$ is too long, the rubber 22 may scorch or cure in the gate. If the length $l_F$ is too short, then the fibers may not become fully oriented in the direction of flow F before entering the mold cavity 18. Since the fibers in the rubber 22 are entering the second distribution gate requiring a reorientation of only 70° to 30°, the length $l_F$ can be reduced from that known disclosed in WO 98/13185. As the rubber 22 flows the direction of flow F through the flat region 28 of the gate 24, the fibers become oriented parallel to the centerline 56 of the sprue and gate plates 50, 66.

Figure 8:
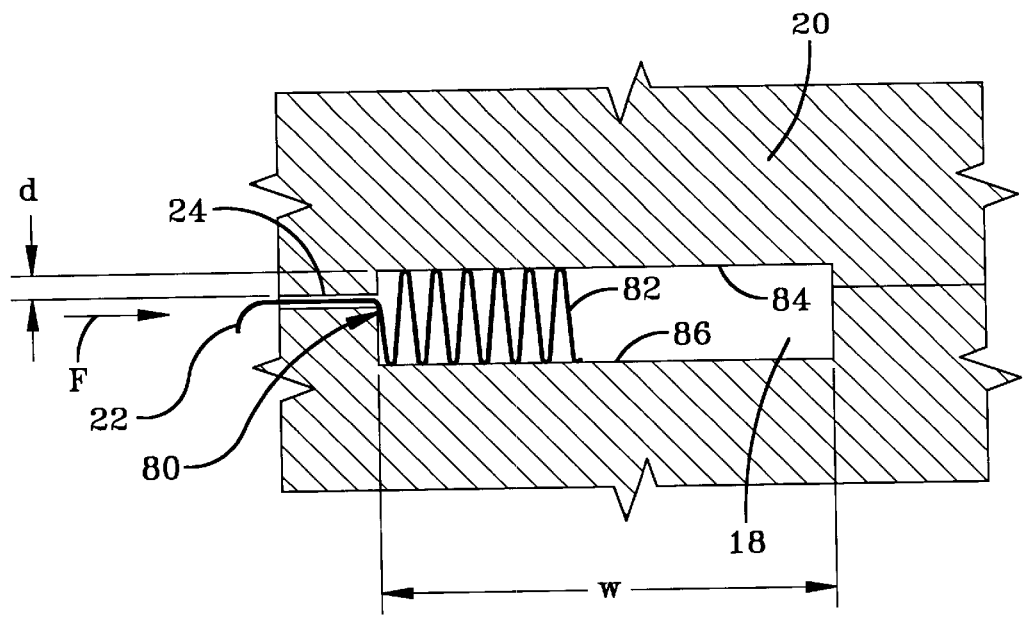
FIG. 8 is a perspective cross-section view of an exemplary mold showing the introduction of molding compound into the mold.
Figure 9:
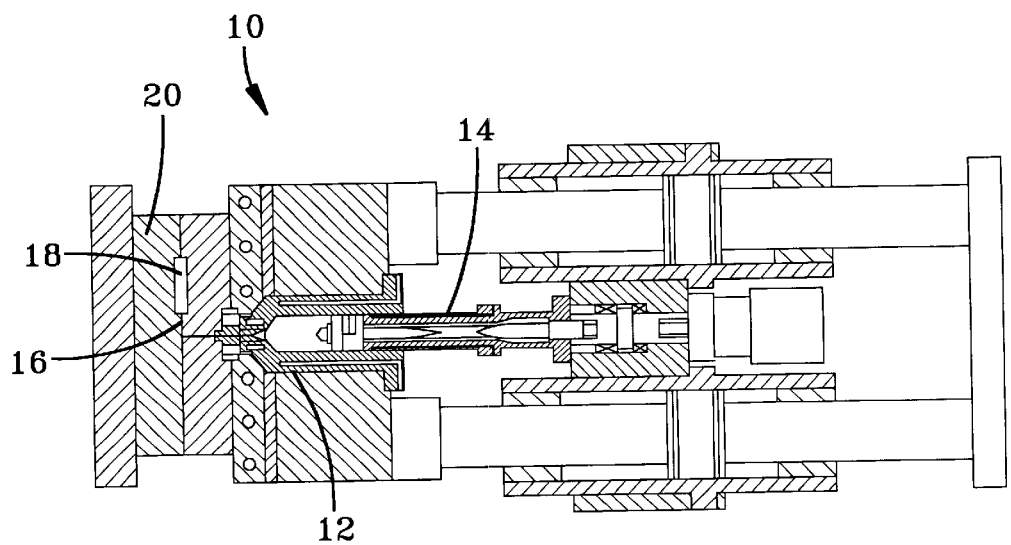
FIG. 9 is a cross-sectional view of a conventional rubber extruder and gate system.

After passing through the gate system 24 into the mold cavity 18, the flow direction of the rubber 22 is altered. As illustrated in FIG. 8, at the gate exit 80, located at the junction of the gate system 24 with the mold cavity 18, the opening for the rubber 22 is significantly increased in the direction parallel to the thickness of the gate system 24. The rubber compound 22 folds over onto itself, creating a series of planes 82 generally perpendicular to the initial direction F as the rubber 22 fills the mold cavity 18.

The offset distance d between the gate exit 80 and the interior walls 84, 86 of the mold cavity 18 can also influence the orientation of the fibers. If the offset distance d between the gate exit 80 and the interior walls 84, 86 is too small, the rubber 22 may get hung up or temporarily attached to the nearest interior wall 84, 86. While some rubber compounds 22 can be successfully run in some conditions where the offset distance d is equal to zero, generally the offset distance d should be greater than one-fourth of the mold cavity width w. However, in some particular applications, unless the offset distance d is between one-fourth and one-half the mold cavity width w, the type and number of folds necessary to achieve the desired fiber orientation may not occur. For more details regarding the various parameters of different applications, reference is made to the incorporated WO 98/13185.

Comparison Test

Comparisons between a flat gate and the inventive combination gate 24 were prepared. Samples of a Keviar pulp loaded rubber compound were prepared using both a flat gate and the inventive combination gate 24. The combination gate 24 had a lattice entrance structure 30 of 45/20/0.031"/0.51" (channel angle/number of channels/channel radius/length) and a flat gate exit structure 32 of 0.010"/0.5" (thickness/length). The flat gate had a structure of 0.010"/1.0" (thickness/length). The barrel temperatures, mold temperatures, and injection speed for both samples. Both 5"×5"×⅞" block and 5"×5"×¹⁄₁₀" sheet samples were prepared.

Test Sample 1

Five samples were taken from sheet samples 1.0" from the gates. The five samples were circular samples, spaced across the width of the sheet sample. The x direction is the lateral direction of the sheet, and y is the injection direction of the sheet; the desired orientation is y. The following chart shows the results of the orientation of the fibers in the samples, in comparison to the sample location. The solvent swell ratios given in the table are average of three samples and obtained by dividing the length in the y direction by the length in the x direction. The swelling ratio is defined as a short axis divided by a long axis when a circular fiber loaded rubber sample is swelled into an oval shape in toluene to equilibrium state. The short axis direction is parallel to the fiber orientation direction. Since fibers were oriented in the short axis, the orientation direction is x if the swell ratio is greater than 1.0 and y if the swell ratio is less than 1.0. The smaller the swelling ratio, the higher the degree of fiber orientation.

TABLE 1

| Sample | Combination Gate | | | Flat Gate | | |
|---|---|---|---|---|---|---|
| Location | Average | Std Dev | Direction | Average | Std Dev | Direction |
| left | 0.880 | 0.024 | y | 0.918 | 0.063 | y |
| mid-left | 0.854 | 0.021 | y | 1.057 | 0.052 | x |
| center | 0.901 | 0.017 | y | 1.280 | 0.096 | x |
| mid-right | 0.868 | 0.035 | y | 1.080 | 0.043 | x |
| right | 0.857 | 0.029 | y | 0.950 | 0.031 | y |
| Overall | 0.872++/− 0.019 | | | 1.057 +/− 0.142 | | |

It can be seen that samples made with the combination gate 24 had relatively uniform fiber orientation. The solvent swell ratios ranged from 0.86 to 0.90. On the other hand, samples made with the flat gate, with solvent swell ratios of 0.918 to 1.280, had relatively strong orientation in the lateral direction (x) at the center. The orientation gradually changed to the injection direction (y) toward the sides of the sample, indicating non-uniformity in the fiber orientation. The standard deviations of solvent swell ratios are 0.019 and 0.142 for the combination and flat gates, respectively. The results of the sheet samples show that the combination gate 24 is much better in preparing injection molded parts with uniform fiber orientation and, thus, more uniform physical properties.

Test Sample 2

From block samples prepared by the combination gate 24 and a flat gate, a thin slice was cut at a location one inch from the gate and five samples were taken to test the fiber orientation in the thickness direction (z) of the block. The five samples were circular samples, spaced across the width of the thin slice. Three block samples prepared under identical conditions were used to obtain variation in solvent swell data. As noted above, the smaller the swelling ratio, the higher the degree of fiber orientation.

TABLE 2

| Sample | Combination Gate | | | Flat Gate | | |
|---|---|---|---|---|---|---|
| Location | Average | Std Dev | Direction | Average | Std Dev | Direction |
| left | 0.675 | 0.024 | z | 0.824 | 0.063 | z |
| mid-left | 0.679 | 0.021 | z | 0.725 | 0.052 | z |
| center | 0.688 | 0.017 | z | 0.779 | 0.096 | z |
| mid-right | 0.654 | 0.035 | z | 0.748 | 0.043 | z |
| right | 0.691 | 0.029 | z | 0.714 | 0.031 | z |
| Overall | 0.678 +/− 0.015 | | | 0.758 +/− 0.044 | | |

The results show that the block samples produced from the combination gate 24 had a high degree of fiber orientation in the thickness direction. The average solvent swell ratios are 0.678 and 0.758 for the combination and flat gates, respectively. The standard deviation of the solvent swell ratios for the combination gate is also lower, 0.015 vs. 0.044, indicating more uniform fiber orientation within the sample.

The illustrated gate has a lattice region 26 and a flat region 28 that are of substantially the same length $l_L$, $l_F$. While this is the preferred length ratio of the lattice region 26 and the flat region 28, the ratio of the lattice region 26 to the flat region 28 may vary from 2:1 to 1:2 and still achieve the desired high degree of fiber orientation in the rubber exiting the gate system 24.

The fibers in the rubber 22 injected into the combination gate system 24 may be any conventional fiber used in manufacturing fiber reinforced rubber articles. This includes short fibers have a length ranging from 0.1 microns to $10^3$ microns and fibers have a length up to and including 0.5 inch (1.2 cm). To properly orient fibers of the longer lengths, the actual length of the gate 24, the diameter of the flow channels 38, 40, and the thickness t of the flat region 28 may be increased to achieve the necessary mixing and reorientation discussed above.

Additionally, while the disclosed invention illustrates a closed cavity mold, it will be appreciated by those skilled in the art that the mold may be an open ended mold. In such a mold, the defined relationships between the gate exit 80 and mold walls 84, 86 remain as described above; however, there is no end wall to limit the movement of the uncured rubber through the mold. Uncured rubber flow through the gate exit 80, forming the folding planes 82, and continues through the cavity to form a continuous strip of rubber defined by folded planes 82 creating a rubber with oriented fibers.

The inventive lattice/flat combination gate 24 offers both the advantages of the lattice and flat gates and an unexpected benefit of a higher degree of fiber orientation in the thickness direction and more uniform fiber orientation distribution. The achieved higher degree of orientation can not be achieved by using only the lattice gate or only the flat gate; nor would such a eater degree of orientation be expected by the mere combination of the two gate designs.

What is claimed is:

1. An improved method of injection molding rubber, the method comprising injecting a rubber (22) through an injection gate (24) wherein the rubber (22) flows through a first region (26) at cross angles (38,40) through the injection gate (24), relative to the direction of flow of the rubber (22) through the injection gate (24), the improvement being characterized by the rubber (22) then flowing through an adjacent second region (28) through the injection gate (24) at a direction parallel to the direction of flow of the rubber through the entire injection gate (24).

2. An improved method of injection molding rubber in accordance with claim 1, the improvement being further characterized by injecting a fiber-loaded rubber.

3. An improved method of injection molding rubber in accordance with either claim 1 or 2, the improvement being further characterzed by the distance ($l_L$) of the rubber flow during the cross angle flow, relative to a centerline (56) of the gate (24), having a distance relative to the distance ($l_F$) of the rubber flowing during the parallel direction flow, relative to a centerline (56) of the gate (24), within the ratio of 2:1 to 1:2.

4. An improved method of injection molding rubber in accordance with claim 1, the improvement being further characterized by the additional step of directing the rubber (22) through an injection gate exit (80) into a mold cavity (18) to form a series of folding planes (82) perpendicular to the direction of flow through the injection gate exit (80).

5. An improved method of injection molding rubber in accordance with claim 4 wherein the rubber is a fiber-loaded rubber.

6. An improved method of injection molding rubber in accordance with either claim 4 or 5, the improvement being further characterized by the distance ($l_L$) of the rubber flow during the cross angle flow, relative to a centerline (56) of the gate (24), having a distance relative to the distance ($l_F$) of the rubber flowing during the parallel direction flow, relative to a centerline (56) of the gate (24), within the ratio of 2:1 to 1:2.

7. An improved gate system (24) for injection molding of rubber into a mold cavity (18), the gate system (24) comprising a first region (26) of a first and a second plurality of spaced flow channels (38, 40) disposed at intersecting angles to each other to create cross directional flow of the rubber (22), the improvement being characterized by the gate system (24) having a region (28) adjacent to the first region (26) to create a unidirectional flow of the rubber (22).

8. An improved gate system (24) in accordance with claim 7 the improvement being further characterized by the length ($l_L$) of the first region (26) along a centerline (56) of the gate having a length relative to the length ($l_F$) of the adjacent region (28) along a centerline (56) of the gate (24) within the ratio of 2:1 to 1:2.

* * * * *